US008648920B2

(12) United States Patent
Terajima

(10) Patent No.: US 8,648,920 B2
(45) Date of Patent: Feb. 11, 2014

(54) ELECTROMAGNETICALLY DRIVEN DEVICE WITH SHAKE SUPPRESSION

(75) Inventor: Kokichi Terajima, Tokyo (JP)

(73) Assignees: Micro Win Tech Inc., Tokyo (JP);
Largan Precision Co., Ltd., Taichung (TW); Kokichi Terajima, Tokyo (JP);
Xinhongzhou Precision Technology Co., Ltd, Xiamen (CN)

(*) Notice: Subject to any disclaimer, the term of this patent is extended or adjusted under 35 U.S.C. 154(b) by 0 days.

(21) Appl. No.: 13/467,571

(22) Filed: May 9, 2012

(65) Prior Publication Data
US 2012/0300088 A1   Nov. 29, 2012

(30) Foreign Application Priority Data

May 24, 2011 (JP) ................. 2011-116134

(51) Int. Cl.
H04N 5/228    (2006.01)
G02B 15/14    (2006.01)
G02B 7/02     (2006.01)

(52) U.S. Cl.
USPC ............ 348/208.7; 348/208.99; 348/208.4; 348/208.2; 359/694; 359/811

(58) Field of Classification Search
USPC ............ 348/208.1–208.99; 359/694–700, 359/811–824
See application file for complete search history.

(56) References Cited

U.S. PATENT DOCUMENTS

| | | | | |
|---|---|---|---|---|
| 5,088,805 A * | 2/1992 | Meyer et al. | | 359/814 |
| 7,437,064 B2 * | 10/2008 | Seo | | 396/75 |
| 7,920,780 B2 * | 4/2011 | Saito | | 396/55 |
| 8,009,371 B2 * | 8/2011 | Sue et al. | | 359/824 |
| 8,040,620 B2 * | 10/2011 | Wade et al. | | 359/824 |
| 8,213,100 B2 * | 7/2012 | Wade et al. | | 359/824 |
| 8,279,289 B2 * | 10/2012 | Nagata et al. | | 348/208.11 |
| 2002/0005995 A1 * | 1/2002 | Choi et al. | | 359/819 |
| 2003/0234990 A1 * | 12/2003 | Akanuma | | 359/819 |
| 2007/0053082 A1 * | 3/2007 | Sue et al. | | 359/819 |
| 2009/0128637 A1 * | 5/2009 | Noji | | 348/208.1 |
| 2009/0213445 A1 * | 8/2009 | Kabeya | | 359/198.1 |
| 2009/0303621 A1 * | 12/2009 | Sue et al. | | 359/824 |
| 2010/0091120 A1 * | 4/2010 | Nagata et al. | | 348/208.4 |
| 2010/0188760 A1 * | 7/2010 | Wade et al. | | 359/824 |
| 2010/0309324 A1 * | 12/2010 | Shirono | | 348/208.11 |
| 2011/0075278 A1 * | 3/2011 | Nagaoka et al. | | 359/819 |
| 2012/0154614 A1 * | 6/2012 | Moriya et al. | | 348/208.5 |

FOREIGN PATENT DOCUMENTS

| | | | |
|---|---|---|---|
| JP | 2004-280031 | 7/2004 | |
| WO | WO 2010/043078 A1 | 4/2010 | |
| WO | WO2011021559 * | 2/2011 | ............ H04N 5/232 |

* cited by examiner

Primary Examiner — Chia-Wei A Chen
(74) Attorney, Agent, or Firm — Morris, Manning & Martin, LLP; Tim Tingkang Xia, Esq.

(57) ABSTRACT

This invention provides an electromagnetically driven device applicable to a lens driving device with an anti-shake function by a simple structure that enables the movable member to swing around an axis thereof. A flat spring for swinging connects to a stationary frame body provided with a permanent magnet set and a coil set for swinging is mounted on an outer circumference of a movable frame body. When an axial direction of the movable frame body is designated as the Z axis, the coil set for swinging including a first through fourth coils arranged around the Z axis and spaced at uniform intervals with each winding around an axis perpendicular to the Z axis and opposite to the permanent magnet set respectively. The permanent magnet set includes a first through fourth magnets, wherein each magnet is arranged between two adjacent coils among the first through fourth coils.

4 Claims, 9 Drawing Sheets (a)

(b)

(a)

(b)

(a)

(b)

(a)

(b)

(a)

(b)

ELECTROMAGNETICALLY DRIVEN DEVICE WITH SHAKE SUPPRESSION

CROSS-REFERENCE TO RELATED APPLICATIONS

This non-provisional application claims priority under 35 U.S.C. §119(a) on Patent Application No. JP2011-116134 filed in Japan on May 24, 2011, the entire contents of which are hereby incorporated by reference.

FIELD OF THE INVENTION

The present invention relates to an electromagnetically driven device capable of suppressing shakes for devices such as photographic optical devices.

DESCRIPTION OF RELATED ART

In recent years, the increase in pixel number of an image sensor for the camera equipped in the mobile device such as mobile phone has increased the quality of photographic image. Along with such tendency, the lens system equipped in such devices is modified from conventional fixed-focal type camera modules to vari-focal type camera modules. This is because the fixed-focal type camera modules may suffer out-of-focus problem and be unable to support the resolution performance of the image sensor with a large amount of pixels.

The lens driving device employing the voice coil motor (VCM) is generally used to implement the driving scheme of the lens system in the vari-focal type camera module (For example, please refer to Patent Document 1).

Shakes occur easily in cameras equipped in mobile phones during the photographing process, thus the present invention provides a lens driving device capable of swinging the lens holder to suppress shakes. As the function of driving the lens holder in an optical axis direction of the lens can suppress shakes, sharp images will be formed on the image sensor (For example, please refer to Patent Document 2).

Patent Document 1: JP 2004-280031
Patent Document 2: WO 2010/043078 A1

As the coil for driving lens holder and suppressing shakes employed in a conventional lens driving device with an anti-shake function is wound around an axis perpendicular to the optical axis of the lens, the configuration of magnets is complex and the driving efficiency is low.

BRIEF DESCRIPTION OF THE INVENTION

To solve the aforementioned problems, an object of the present invention is to provide an electromagnetically driven device applicable to devices such as lens driving devices or camera modules with an anti-shake function by a simple structure that enables the movable member to swing around an axis thereof.

The present invention provides an electromagnetically driven device comprising: a stationary member; a barrel-shaped or column-shaped movable member; a spring member supporting the movable member while suspending it from the stationary member; a coil set for swinging; and a permanent magnet set. The electromagnetically driven device is characterized in that: the coil set for swinging is mounted on an outer circumference of the movable member and the permanent magnet set is mounted on the stationary member and arranged opposite to the coil set for swinging with spacing, that when an axial direction of the movable member is designated as the Z axis, the configuration of the coil set for swinging including a first through fourth coils is such that the first through fourth coils are wound around axes perpendicular to the Z axis, arranged around the Z axis in numeral sequence and spaced at uniform intervals, and that the permanent magnet set includes a first through fourth magnets, wherein each magnet is arranged between two adjacent sections parallel to the Z axis of two adjacent coils among the first through fourth coils.

In the present invention, the unipolar surface of the magnet is configured to face the coil, and such a simple configuration enables the movable member to move in the plane perpendicular to the Z axis. Therefore, the present invention can provide a compact shake suppression device for a lens driving device having a simple structure if the movable member is set to be the lens driving device.

Further, the present invention is characterized in that the movable member holds a lens unit, that the driving coil wound around the Z axis is mounted on an outer circumferential side of the movable member, and that the coil set for swinging is mounted on an outer circumferential side of the driving coil.

Alternatively, the present invention is characterized in that the movable member holds the lens unit, that the driving coil wound around the Z axis is mounted on an outer circumferential side of the movable member, and that the coil set for swinging is mounted on an inner circumferential side of the driving coil. With the aforementioned configurations, the prevent invention can provide a tightly structured lens driving device having an auto-focus driving function and a shake suppression function built in.

Further, the present invention is characterized in that the movable member holds a camera module. The present invention can provide the camera module characterized by a simple structure and a shake suppression function if the movable member is set to be a camera module comprising at least a lens and an image sensor.

The brief description does not recite all essential features of the present invention, and the sub-combination of these features falls within the scope of the present invention.

DETAILED DESCRIPTION OF THE INVENTION

The present invention will now be described with detailed embodiments. The following embodiments do not intend to confine the invention relevant to the scope of claims. Moreover, all combinations of the features described in the embodiments are not necessarily included in the solutions of the present invention.

The First Embodiment

Figure 1:
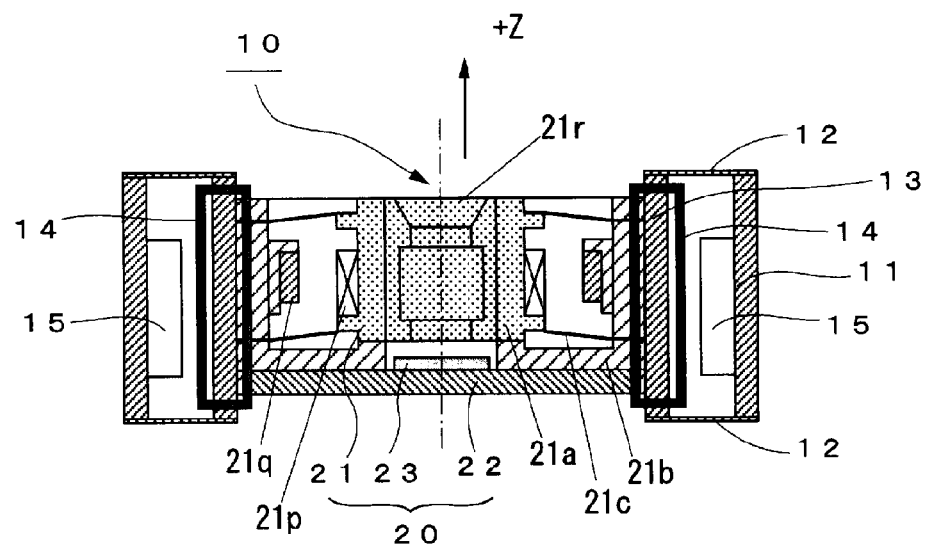
FIGS. 1(a) and 1(b) are diagrams illustrating the structure of a shake suppression device in accordance with a first embodiment of the present invention.
Figure 1:
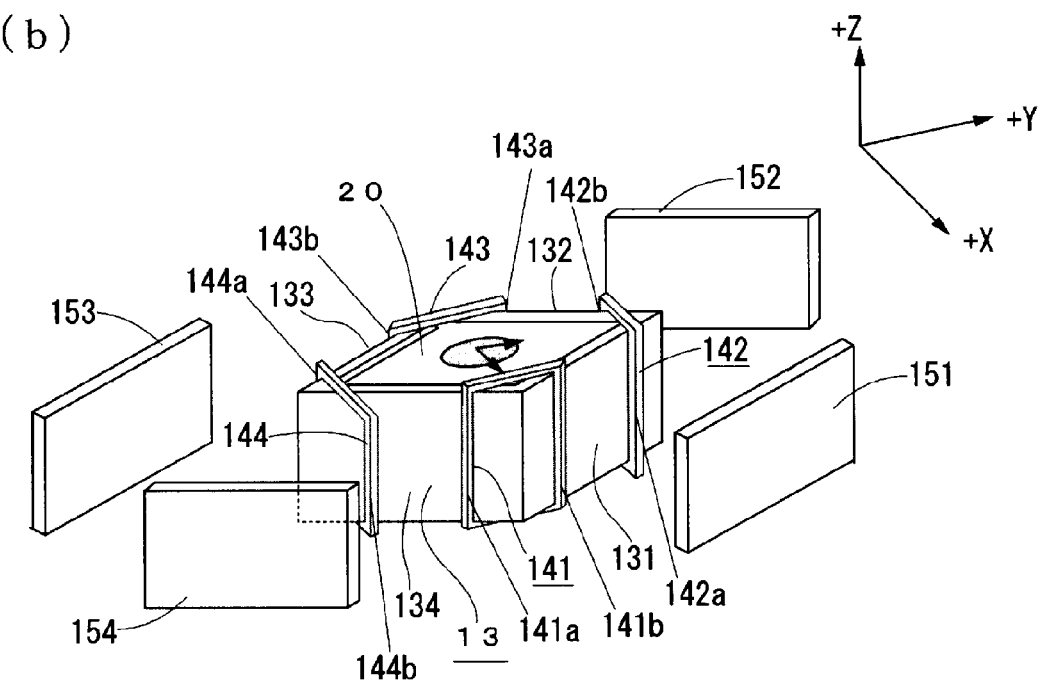

FIG. 1 illustrates the structure of a shake suppression device 10 serving as an electromagnetically driven device in accordance with a first embodiment of the present invention. FIG. 1(*a*) is a section view of the shake suppression device 10, and FIG. 1(*b*) is a main component oblique view showing the relation between the coil set for swinging 14 and the permanent magnet set 15.

In the first embodiment of the present invention, there is a shake suppression device 10 comprising: a stationary frame body 11 serving as a stationary member; a movable frame body 13 serving as a movable member and suspended from the stationary frame body 11 in an object-side direction via a flat spring for swinging 12 serving as a spring member and capable of moving freely; a coil set for swinging 14 mounted on the movable frame body 13; a permanent magnet set 15 mounted on the stationary frame body 11 and spaced from the coil set for swinging 14; a shake sensor (not shown); and a current control means. As the shake suppression device 10 comprises the aforementioned components, a camera module 20 is provided with the movable frame body 13. The camera module 20 comprises the following components: a lens driving device 21, a holding pedestal 22 for holding a case 21*b* of the lens driving device 21 at the reverse side to the object side, and an image sensor 23 disposed on the holding pedestal 22 at the side close to the lens driving device 21. The lens driving device 21 comprises the following components: a lens holder 21*a* holding a lens 21*r* and provided with a driving coil 21*p* at its outer circumferential side, a case 21*b* provided with a permanent magnet set 21*q*, and a spring member 21*c* connecting the lens holder 21*a* and the case 21*b*.

Figure 2:
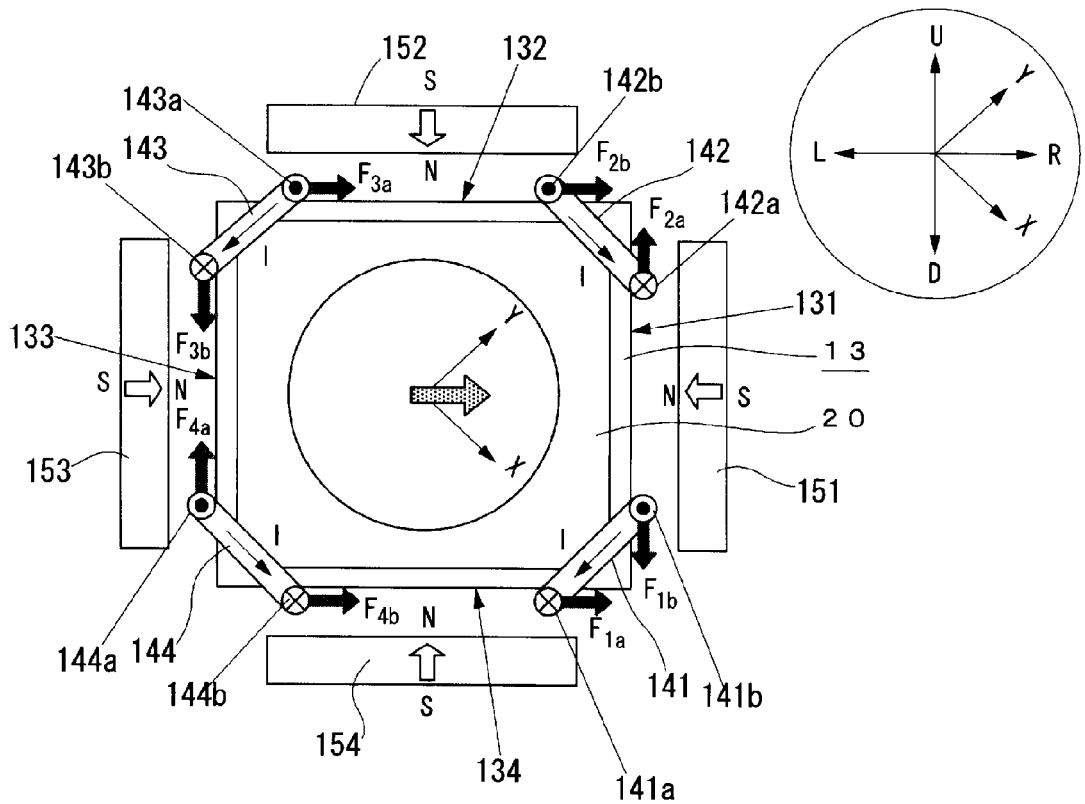
FIG. 2 is an exemplary diagram illustrating the direction of the current flowing in the coil set for swinging of the shake suppression device and the Lorentz force acting upon the driving coil in accordance with the first embodiment of the present invention.

As shown in FIG. 1(*b*) and FIG. 2, if the camera module 20 has a square-shaped contour when viewed from the object side, the movable frame body 13 is a barrel-shaped component with an opening thereof having a square cross section in the object-side direction, and the camera module 20 is installed at an inner wall of the movable frame body 13. Further, regarding the stationary frame body 11, the edge of the inner circumferential side thereof may be of a square shape when viewed from the object side.

The object-side direction is hereafter referred as a forward direction of the Z axis (+Z side). When viewed from the +Z side, the four sides of the movable frame body 13 are denoted respectively by 131, 132, 133 and 134 in the counterclockwise direction. The direction from the intersection of the sides 132 and 133 toward the intersection of the sides 134 and 131 is designated as a forward direction of the X axis (+X side); the direction from the intersection of the sides 133 and 134 toward the intersection of the sides 131 and 132 is designated as a forward direction of the Y axis (+Y side).

The direction from the side 133 toward the side 131 is designated as a forward direction of the R axis (R side); the side reverse to the R side is designated as the L side; the direction from the side 134 toward the side 132 is designated as a forward direction of the U axis (U side); the side reverse to the U side is designated as the D side.

Figure 3:
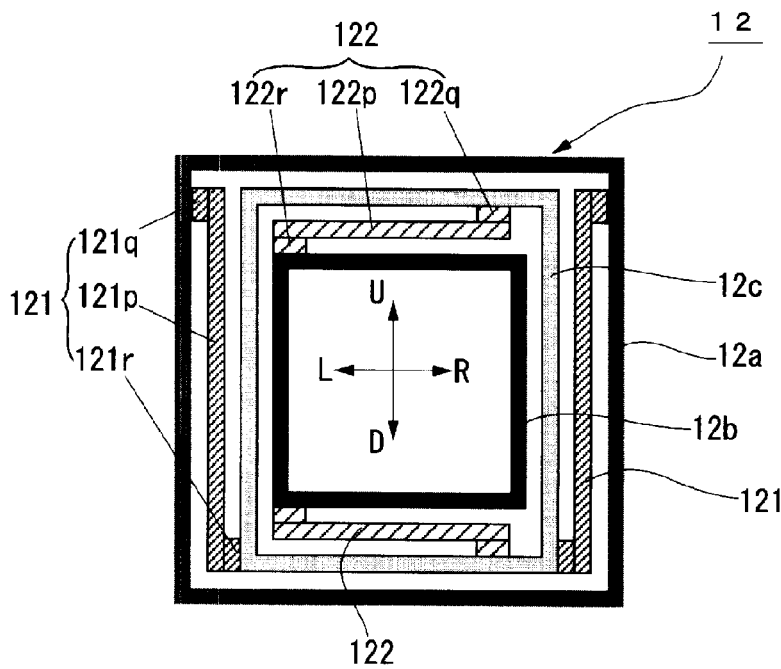
FIG. 3 is a diagram illustrating a configuration of a flat spring for swinging.

For the flat spring for swinging 12, similar square plate-shaped frames 12*a*, 12*b* and 12*c* are connected to one another through the connecting arms 121, 122, as shown in FIG. 3.

The frame 12*a* is an outer circumferential stationary frame fixed to the inner edge of the stationary frame body 11; the frame 12*b* is an inner circumferential stationary frame fixed to the outer edge of the movable frame body 13; the frame 12*c* is a movable frame arranged between the outer circumferential stationary frame 12*a* and the inner circumferential stationary frame 12*b*.

The connecting arm 121 comprises an arm portion 121*p* parallel to the R side section and the L side section of the outer circumferential stationary frame 12*a* and the movable frame 12*c*, a connecting piece 121*q* arranged at the U side of the arm portion 121*p* for connecting the outer circumferential stationary frame 12*a* and the arm portion 121*p*, and a connecting piece 121*r* arranged at the D side of the arm portion 121*p* for connecting the arm portion 121*p* and the movable frame 12*c*. The connecting arm 121 connects the outer circumferential stationary frame 12*a* and the movable frame 12*c*.

The connecting arm 122 comprises an arm portion 122*p* parallel to the U side section and the D side section of the movable frame 12*c* and the inner circumferential stationary frame 12*b*, a connecting piece 122*q* arranged at the R side of the arm portion 122*p* for connecting the arm portion 122*p* and the movable frame 12*c*, and a connecting piece 122*r* arranged at the L side of the arm portion 122*p* for connecting the arm portion 122*p* and the inner circumferential stationary frame 12*b*. The connecting arm 122 connects the movable frame 12*c* and the inner circumferential stationary frame 12*b*.

The combination of the movable frame 12*c* and the connecting arms 121, 122 is substantially the movable portion of the flat spring for swinging 12 serving as a spring member.

With such a configuration, the flat spring for swinging 12 can move easily in the R, L, U or D direction. Accordingly, the movable frame body 13 can be moved effectively.

Figure 4:
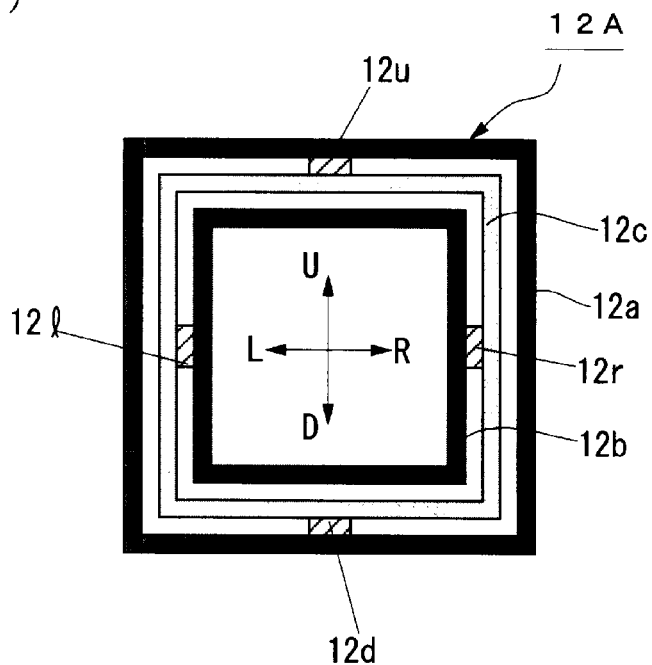
FIGS. 4(a) and 4(b) are diagrams illustrating alternative configurations of the flat spring for swinging.
Figure 4:
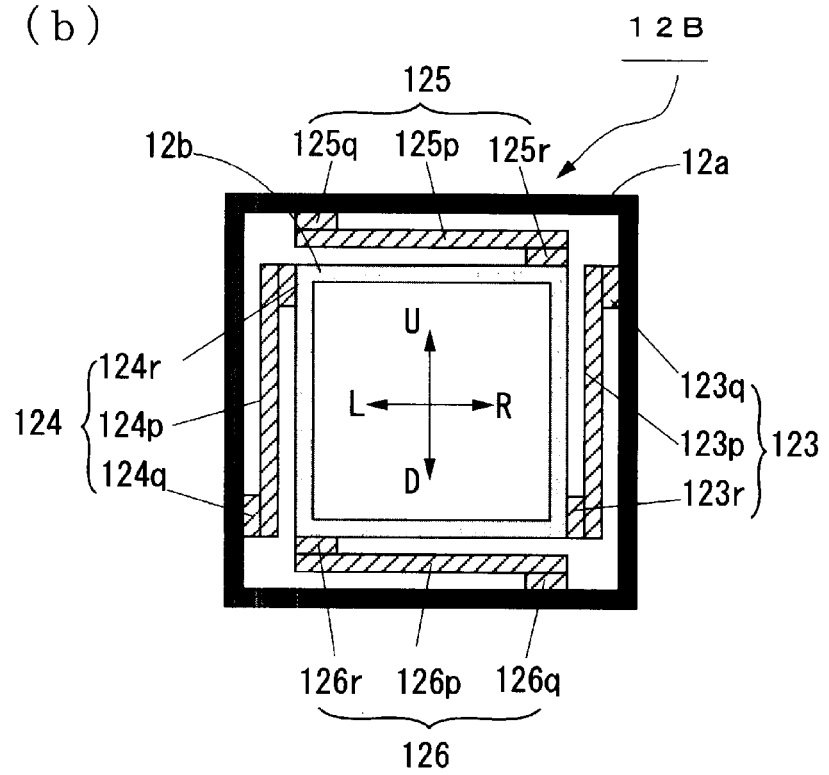

Further, the flat spring for swinging of the present invention may be a flat spring for swinging 12A configured in the manner shown in FIG. 4(*a*). Referring to FIG. 4(*a*), the connection between the outer circumferential stationary frame 12*a* and the movable frame 12*c* is established through the connecting pieces 12*u*, 12*d* arranged respectively at the center of the U side and the D side; the connection between the movable frame 12*c* and the inner circumferential stationary frame 12*b* is established through the connecting pieces 12*r*, 12*l* arranged respectively at the center of the R side and the L side. Alternatively, a flat spring for swinging 12B configured in the manner shown in FIG. 4(b) may be used in the present invention. Referring to FIG. 4(b), the outer circumferential stationary frame 12a and the inner circumferential stationary frame 12b are connected through the connecting arms 123-126 arranged at the R side, L side, U side and D side. The connecting arm 123 comprises an arm portion 123p parallel to the R side sections of the outer circumferential stationary frame 12a and the inner circumferential stationary frame 12b, a connecting piece 123q arranged at the U side of the arm portion 123p for connecting the outer circumferential stationary frame 12a and the arm portion 123p, and a connecting piece 123r arranged at the D side of the arm portion 123p for connecting the arm portion 123p and the inner circumferential stationary frame 12b. The connecting arm 124 comprises an arm portion 124p parallel to the L side sections of the outer circumferential stationary frame 12a and the inner circumferential stationary frame 12b, a connecting piece 124q arranged at the D side of the arm portion 124p for connecting the outer circumferential stationary frame 12a and the arm portion 124p, and a connecting piece 124r arranged at the U side of the arm portion 124p for connecting the arm portion 124p and the inner circumferential stationary frame 12b. The connecting arm 124 connects the outer circumferential stationary frame 12a and the inner circumferential stationary frame 12b at the R side and the L side, respectively.

The connecting arm 125 comprises an arm portion 125p parallel to the U side sections of the outer circumferential stationary frame 12a and the inner circumferential stationary frame 12b, a connecting piece 125q arranged at the L side of the arm portion 125p for connecting the outer circumferential stationary frame 12a and the arm portion 125p, and a connecting piece 125r arranged at the R side of the arm portion 125p for connecting the arm portion 125p and the inner circumferential stationary frame 12b. The connecting arm 126 comprises an arm portion 126p parallel to the D side sections of the outer circumferential stationary frame 12a and the inner circumferential stationary frame 12b, a connecting piece 126q arranged at the R side of the arm portion 126p for connecting the outer circumferential stationary frame 12a and the arm portion 126p, and a connecting piece 126r arranged at the L side of the arm portion 126p for connecting the arm portion 126p and the inner circumferential stationary frame 12b. The connecting arm 126 connects the outer circumferential stationary frame 12a and the inner circumferential stationary frame 12b at the U side and the D side, respectively.

As shown in FIG. 1(b), the coil set for swinging 14 comprises a first through fourth coils 141-144, wherein the first and third coils 141 and 143 are wound around the X axis and the second and fourth coils 142 and 144 are wound around the Y axis. The first coil 141 and the third coil 143 are arranged respectively at the +X side portion and the −X side portion of the outer circumference of the movable frame body 13. The second coil 142 and the fourth coil 144 are arranged respectively at the +Y side portion and the −Y side portion of the outer circumference of the movable frame body 13.

The permanent magnet set 15 comprises a first through fourth magnets 151-154 having magnetic fields in directions perpendicular to the plate surfaces, which correspond to the respective sides 131-134 of the movable frame body 13 installed at the inner wall of the stationary frame body 11 and spaced from the first through fourth coils 141-144. In this example, the first through fourth magnets 151-154 have magnetic fields in directions the same as those of the sides 131-134 of the movable frame body 13. That is, the polarity of the first through fourth magnets 151-154 at respective sides close to the movable frame body 13 is the same (N-polarity).

Specifically, the first magnet 151 is arranged between the section 141b of the first coil 141, which is parallel to the Z axis and close to the second coil 142, and the section 142a of the second coil 142, which is parallel to the Z axis and close to the first coil 141, as shown in FIG. 1(b) and FIG. 2. A magnetic field in a direction from the R side to the L side is applied to the section 141b of the first coil 141 and the section 142a of the second coil 142.

Similarly, the second magnet 152 is arranged between the section 142b of the second coil 142, which is parallel to the Z axis and close to the third coil 143, and the section 143a of the third coil 143, which is parallel to the Z axis and close to the second coil 142. A magnetic field in a direction from the U side to the D side is applied to the section 142b of the second coil 142 and the section 143a of the third coil 143.

The third magnet 153 is arranged between the section 143b of the third coil 143, which is parallel to the Z axis and close to the fourth coil 144, and the section 144a of the fourth coil 144, which is parallel to the Z axis and close to the third coil 143. A magnetic field in a direction from the L side to the R side is applied to the section 143b of the third coil 143 and the section 144a of the fourth coil 144.

The fourth magnet 154 is arranged between the section 144b of the fourth coil 144, which is parallel to the Z axis and close to the first coil 141, and the section 141a of the first coil 141, which is parallel to the Z axis and close to the fourth coil 144. A magnetic field in a direction from the D side to the U side is applied to the section 144b of the fourth coil 144 and the section 141a of the first coil 141.

The motion of the shake suppression device 10 of the present invention will be described in the following paragraphs.

Firstly, a shake sensor (not shown) is used to detect whether a shake occurs in the stationary frame body 11. When shake occurs, the degree and the direction information of the shake detected by the shake sensor is sent to a current control means (not shown). The current control means controls the magnitudes and directions of the currents powering the first through fourth coils 141-144 according to the detected degree and the direction of the shake so that the movable frame body 13 can be swung to suppress the shake.

The directions of the currents powering the first through fourth coils 141-144 are defined as follows.

When viewed from the +Z side, the direction of the current flowing in the first coil 141 from the side 131 to the side 134 is designated as "+" direction, and the direction of the current flowing in the first coil 141 from the side 134 to the side 131 is designated as "−" direction.

Similarly, the direction of the current flowing in the second coil 142 from the side 132 to the side 131 is designated as "+" direction, and the direction of the current flowing in the second coil 142 from the side 131 to the side 132 is designated as "−" direction. The direction of the current flowing in the third coil 143 from the side 133 to the side 132 is designated as "+" direction, and the direction of the current flowing in the third coil 143 from the side 132 to the side 133 is designated as "−" direction. The direction of the current flowing in the fourth coil 144 from the side 134 to the side 133 is designated as "+" direction, and the direction of the current flowing in the fourth coil 144 from the side 133 to the side 134 is designated as "−" direction.

If the shake that causes the stationary frame body 11 to move in the L direction occurs, the current control means enables the directions of the currents powering the first and second coils 141, 142 to be "+" directions and the directions of the currents powering the third and fourth coils 143, 144 to be "−" directions, as shown in FIG. 2. In this example, the polarity of the first through fourth magnets 151-154 at respective sides close to the movable frame body 13 is all N-polarity, thus Lorentz forces $F_{m,n}$ (m=1~4, n=a, b), as indicated by the bold arrows in FIG. 2, will act upon the coils 141-144, respectively.

Specifically, as a magnetic field of the fourth magnet 154 in a direction from the D side to the U side is applied to the current flowing in the −Z direction in the section 141*a* of the first coil 141, a Lorentz force $F_{1a}$ from the L side to the R side acts upon the section 141*a*. As a magnetic field of the first magnet 151 in a direction from the R side to the L side is applied to the current flowing in the +Z direction in the section 141*b* of the first coil 141, a Lorentz force $F_{1b}$ from the U side to the D side acts upon the section 141*b*. As the Lorentz force acting upon the +Z side section of the first coil 141 is offset by the Lorentz force acting upon the −Z side section of the first coil 141, the first coil 141 is acted upon by the aforementioned Lorentz forces $F_{1a}$ and $F_{1b}$ only. Therefore, the first coil 141 is pushed toward the +X direction.

The third coil 143 is also pushed toward the +X direction. As the second coil 142 and the fourth coil 144 are both pushed toward the +Y direction, the movable frame body 13 is swung in the R direction. Accordingly, the shake that causes the stationary frame body 11 to move in the L direction can be suppressed.

Further, with the first coil 141 and the second coil 142 powered by currents in "+" directions and the third and fourth coils 143, 144 not powered, the movable frame body 13 can be swung in the R direction. Alternatively, even if the first and second coils 141, 142 are not powered, the movable frame body 13 can be swung in the R direction by powering the third coil 143 and the fourth coil 144 with currents in "−" directions.

If the shake that causes the stationary frame body 11 to move in the R direction occurs, the current control means enables the directions of the currents powering the first and second coils 141, 142 to be "−" directions and the directions of the currents powering the third and fourth coils 143, 144 to be "+" directions (the directions of the currents powering the first through fourth currents are reverse to those of the embodiment shown in FIG. 2), thereby the movable frame body 13 can be swung in the L direction.

Further, with the third coil 143 and the fourth coil 144 powered by currents in "+" directions and the first and second coils 141, 142 not powered, the movable frame body 13 can be swung in the L direction. Alternatively, even if the third and fourth coils 143, 144 are not powered, the movable frame body 13 can be swung in the L direction by powering the first coil 141 and the second coil 142 with currents in "−" directions.

If the shake that causes the stationary frame body 11 to move in the D direction occurs, the current control means enables the directions of the currents powering the second and third coils 142, 143 to be "+" directions and the directions of the currents powering the fourth and first coils 144, 141 to be "−" directions, thereby the movable frame body 13 can be swung in the U direction.

Further, with the second coil 142 and the third coil 143 powered by currents in "+" directions and the fourth and first coils 144, 141 not powered, the movable frame body 13 can be swung in the U direction. Alternatively, even if the second and third coils 142, 143 are not powered, the movable frame body 13 can be swung in the U direction by powering the fourth coil 144 and the first coil 141 with currents in "−" directions.

If the shake that causes the stationary frame body 11 to move in the U direction occurs, the current control means enables the directions of the currents powering the second and third coils 142, 143 to be "−" directions and the directions of the currents powering the fourth and first coils 144, 141 to be "+" directions, thereby the movable frame body 13 can be swung in the D direction.

Further, with the fourth coil 144 and the first coil 141 powered by currents in "+" directions and the second and third coils 142, 143 not powered, the movable frame body 13 can be swung in the D direction. Alternatively, even if the fourth and first coils 144, 141 are not powered, the movable frame body 13 can be swung in the D direction by powering the second coil 142 and the third coil 143 with currents in "−" directions.

Figure 5:
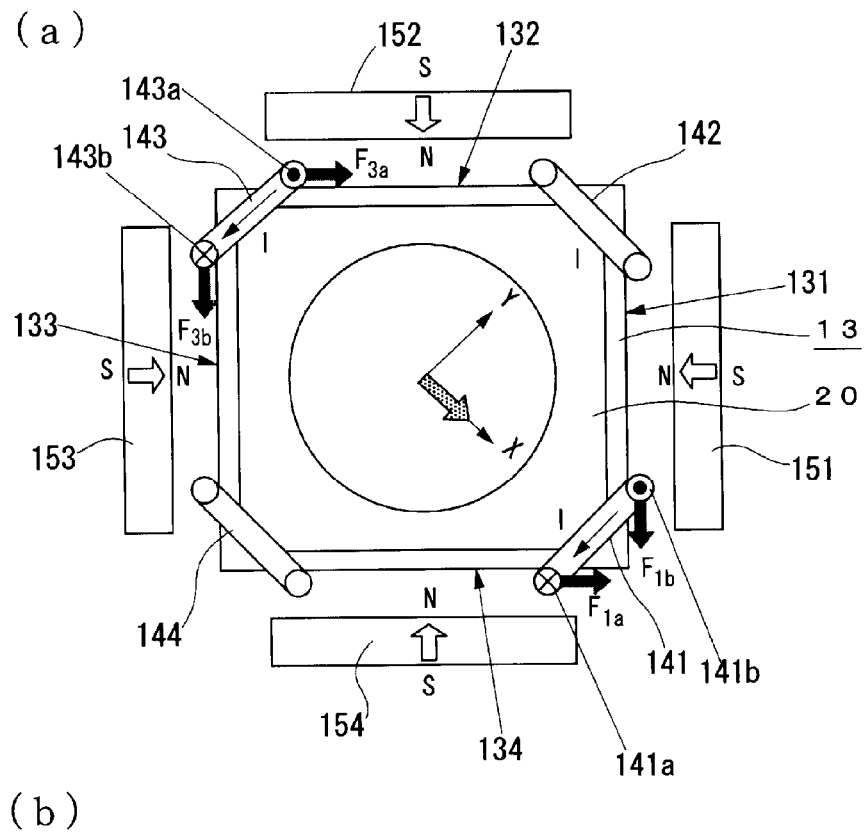
FIGS. 5(a) and 5(b) are exemplary diagrams illustrating the different directions of the current flowing in the coil set for swinging of the shake suppression device and the Lorentz force acting upon the driving coil in accordance with the first embodiment of the present invention.
Figure 5:
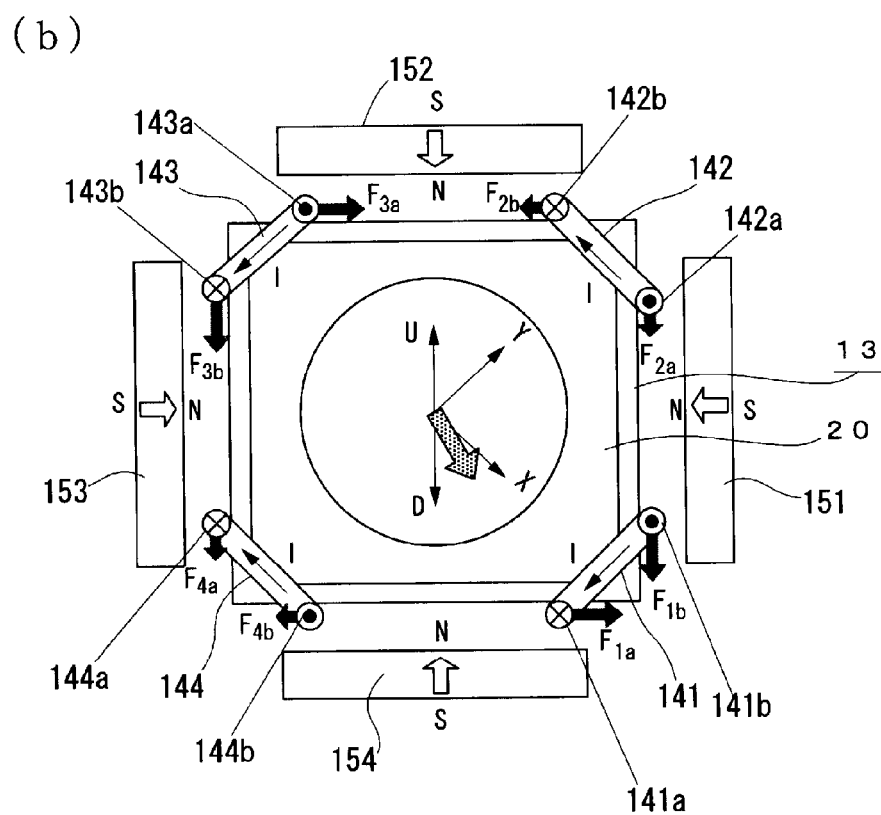

Further, as shown in FIG. 5(*a*), the direction of the current powering the first coil 141 is set to be "+" direction and the direction of the current powering the third coil 143 is set to be "−" direction, and if the second and fourth coils 142, 144 are not powered, the movable frame body 13 can be swung in the +X direction of the diagonal direction thereof. Moreover, the movable frame body 13 can be swung in the +X direction by merely powering the first coil 141 with a current in "+" direction or by merely powering the third coil 143 with a current in "−" direction.

Further, as shown in FIG. 5(*b*), the direction of the current powering the first coil 141 is set to be "+" direction, the direction of the current powering the third coil 143 is set to be "−" direction, the direction of the current powering the second coil 142 is set to be "−" direction, the direction of the current powering the fourth coil 144 is set to be "+" direction, and if the power levels of the currents powering the second coil 142 and the fourth coil 144 are lower than the power levels of the currents powering the first coil 141 and the third coil 143, the movable frame body 13 can be swung in a direction between the +X direction and the D direction.

Further, if the power levels of the currents powering the first through fourth coils 141-144 are the same, the movable frame body 13 can be swung in the D direction as described above.

The movable frame body 13 can be moved in any direction in the XY plane by powering the coils arranged opposite to each other in a diagonal direction of the movable frame body 13 with currents in reverse directions and by changing the power levels of the currents powering the first through fourth coils.

Further, when the polarity of the first through fourth magnets 151-154 at respective sides close to the movable frame body 13 is reversed, the movable frame body 13 can be moved in a reverse direction by means of the aforementioned powering conditions.

In the shake suppression device 10 of the first embodiment, the movable frame body 13 whose outer circumference is provided with the coil set for swinging 14 and the stationary frame body 11 provided with the permanent magnet set 15 are connected by the flat spring for swinging 12. The permanent magnet set 15 is arranged opposite to the coil set for swinging 14 with spacing. When an axial direction of the movable frame body 13 is designated as the Z axis, the coil set for swinging 14 is wound around an axis perpendicular to the Z axis. The coil set for swinging includes a first through fourth coils 141-144 arranged around the Z axis in numeral sequence and spaced at uniform intervals. The permanent magnet set 15 includes a first through fourth magnets 151-154, wherein each magnet is arranged between two adjacent sections parallel to the Z axis of two adjacent coils among the first through fourth coils 141-144. Each of the first through fourth magnets 151-154 is arranged opposite to the coil set for swinging with spacing. Such a simple configuration enables the movable frame body 13 to move easily in the plane perpendicular to the Z axis.

Further, in the first embodiment, the movable frame body 13 has a square barrel-shaped contour when viewed from the +Z side and the first through fourth magnets 151-154 are plate-shaped magnets, but the present invention is not limited thereto. The movable frame body 13 may have an octagon-shaped contour when viewed from the +Z side by arranging concave portions at the R side, L side, U side and D side.

Figure 6:
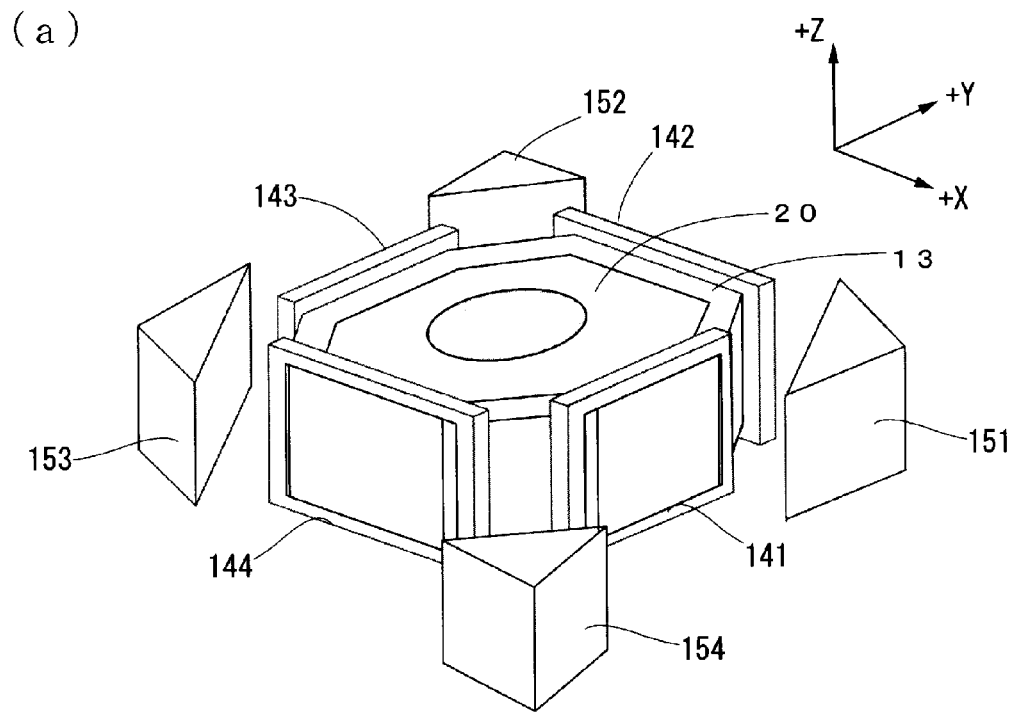
FIG. 6(a) is a diagram illustrating another exemplary structure of the shake suppression device and 6(b) is a diagram illustrating the direction of the current flowing in the coil set for swinging of the shake suppression device and the Lorentz force acting upon the driving coil of the present invention.
Figure 6:
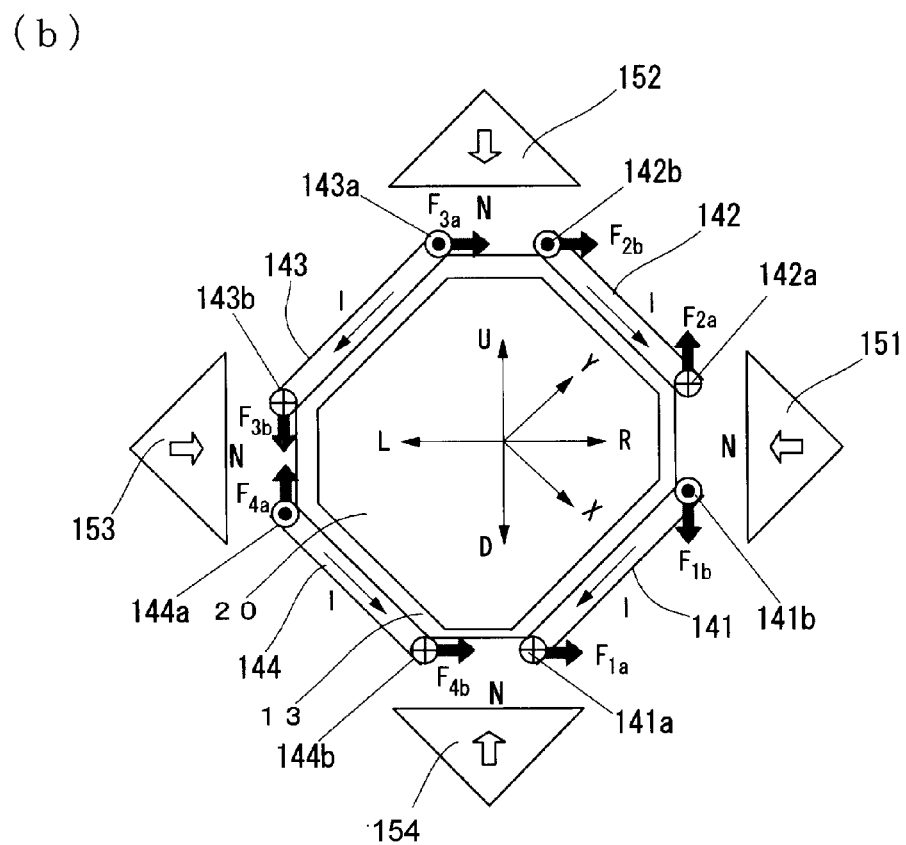

Under the circumstance that the movable frame body 13 has an octagon-shaped contour when viewed from the +Z side, the first through fourth coils 141-144 are arranged respectively at the +X side, +Y side, −X side and −Y side of the octagon and the first through fourth magnets 151-154 are of a triangular prism shape, as shown in FIGS. 6(*a*), (*b*). The triangular prisms face the R side, U side, L side and D side of the movable frame body 13, respectively, and their respective inward side surfaces are magnetic pole surfaces (in this case, N pole). In this way, the arrangement of the first through fourth magnets 151-154 with respect to the first through fourth coils 141-144 is the same as that of the first embodiment. The first magnet 151 is arranged between the section 141*b* of the first coil 141, which is parallel to the Z axis and close to the second coil 142, and the section 142*a* of the second coil 142, which is parallel to the Z axis and close to the first coil 141; the second magnet 152 is arranged between the section 142*b* of the second coil 142, which is parallel to the Z axis and close to the third coil 143, and the section 143*a* of the third coil 143, which is parallel to the Z axis and close to the second coil 142; the third magnet 153 is arranged between the section 143*b* of the third coil 143, which is parallel to the Z axis and close to the fourth coil 144, and the section 144*a* of the fourth coil 144, which is parallel to the Z axis and close to the third coil 143; the fourth magnet 154 is arranged between the section 144*b* of the fourth coil 144, which is parallel to the Z axis and close to the first coil 141, and the section 141*a* of the first coil 141, which is parallel to the Z axis and close to the fourth coil 144.

If the direction of the current powering the first coil 141 is set to be "+" direction and the direction of the current powering the third coil 143 is set to be "−" direction when viewed from the +Z side, the movable frame body 13 can be moved in the +X direction due to the Lorentz forces $F_{1a}$, $F_{1b}$ and $F_{3a}$, $F_{3b}$, as indicated by the bold arrows, acting respectively upon the first and third coils 141, 143.

Further, if the direction of the current powering the second coil 142 is set to be "+" direction and the direction of the current powering the fourth coil 144 is set to be "−" direction, the movable frame body 13 can be moved in the +Y direction due to the Lorentz forces $F_{2a}$, $F_{2b}$ and $F_{4a}$, $F_{4b}$, as indicated by the bold arrows, acting respectively upon the second and fourth coils 142, 144.

Further, if the directions of the currents powering the first and second coils 141, 142 are set to be "+" directions and the directions of the currents powering the third and fourth coils 143, 144 are set to be "−" directions, the movable frame body 13 will be moved in the R direction due to the resultant force of the Lorentz forces $F_{m,n}$(m=1~4, n=a, b).

Further, if the directions of the currents powering the first and fourth coils 141, 144 are set to be "+" directions and the directions of the currents powering the second and third coils 142, 143 are set to be "−" directions, the movable frame body 13 will be moved in the D direction.

Figure 7:
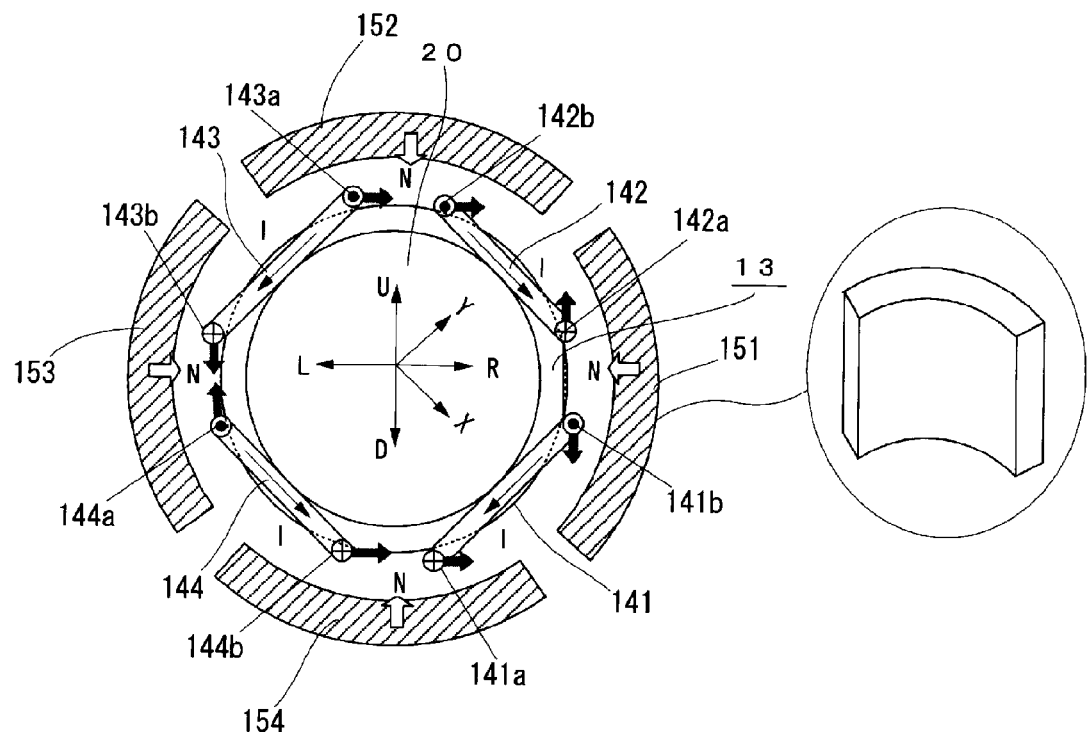
FIG. 7 is a diagram illustrating another exemplary structure of the shake suppression device of the present invention.

Alternatively, the shape of the movable frame body 13 shown in FIGS. 6(*a*), (*b*) is altered to a cylindrical shape as shown in FIG. 7, and even if the first through fourth magnets 151-154 are arc-shaped columnar magnets, the movable frame body 13 can be moved in the same way as the movable frame body shown in FIGS. 6(*a*), (*b*). In this case, the movable frame body 13, like the movable frame body of the first embodiment, can be moved easily in the plane perpendicular to the Z axis if the first magnet 151 is arranged between the section 141*b* of the first coil 141, which is parallel to the Z axis and close to the second coil 142, and the section 142*a* of the second coil 142, which is parallel to the Z axis and close to the first coil 141, the second magnet 152 is arranged between the section 142*b* of the second coil 142, which is parallel to the Z axis and close to the third coil 143, and the section 143*a* of the third coil 143, which is parallel to the Z axis and close to the second coil 142, the third magnet 153 is arranged between the section 143*b* of the third coil 143, which is parallel to the Z axis and close to the fourth coil 144, and the section 144*a* of the fourth coil 144, which is parallel to the Z axis and close to the third coil 143, and the fourth magnet 154 is arranged between the section 144*b* of the fourth coil 144, which is parallel to the Z axis and close to the first coil 141, and the section 141*a* of the first coil 141, which is parallel to the Z axis and close to the fourth coil 144.

Further, while the magnetic poles of the first through fourth magnets 151-154 at respective sides close to the movable frame body 13 are the same in the aforementioned example, the movable frame body 13 can make the same movements as the movable frame body of the first embodiment even if the adjacent magnets have mutually reverse magnetic poles.

Figure 8:
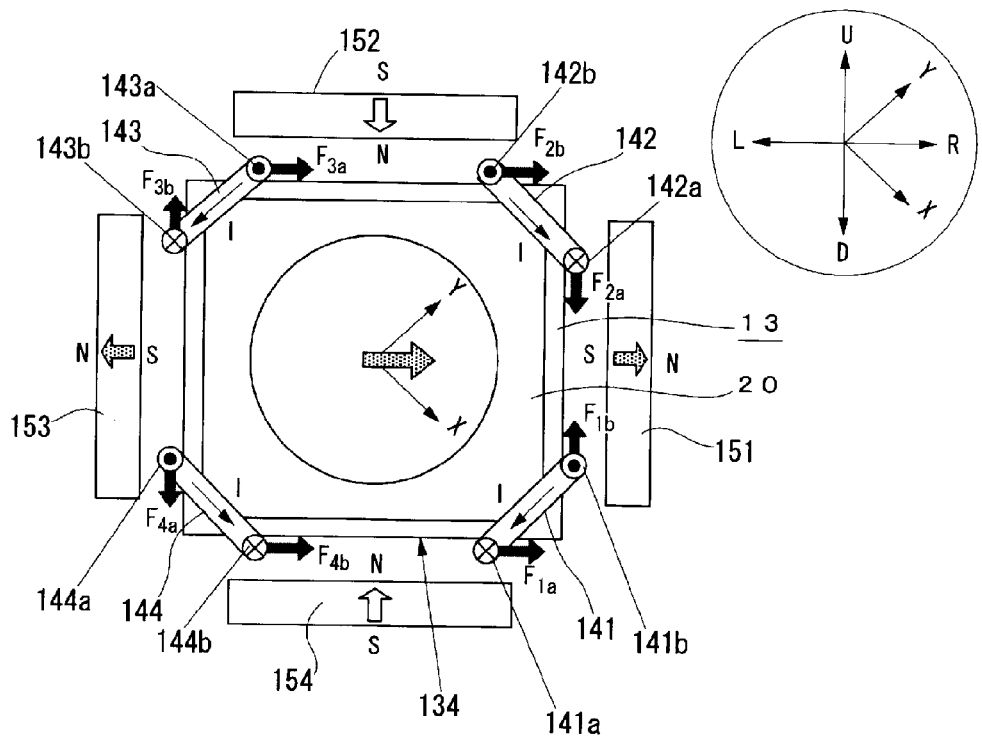
FIG. 8 is a diagram illustrating another method for arranging the permanent magnet set of the shake suppression device.

For example, as shown in FIG. 8, the magnetic poles of the first magnet 151 and the third magnet 153 at respective sides close to the movable frame body 13 are set to be S poles while the magnetic poles of the second magnet 152 and the fourth magnet 154 at respective sides close to the movable frame body 13 are set to be N poles. If the directions of the currents powering the first through fourth coils 141-144 are the same as those shown in FIG. 2, the movable frame body 13, like the one shown in FIG. 2, can be swung in the R direction.

Further, while the holding pedestal 22 holding the lens driving device 21 and the image sensor 23 is mounted on the movable frame body 13 and the coil set for swinging is mounted on the movable frame body 13 in the aforementioned example, the coil set for swinging can be directly mounted on the holding pedestal 22, which is suspended from the stationary frame body 11 and movable via the flat spring for swinging 12, without the use of the movable frame body 13.

Further, while the frames 12*a*, 12*b*, 12*c* of the flat spring for swinging 12 are square plate-shaped in the aforementioned example, the present invention is not limited thereto. The frames 12*a*, 12*b*, 12*c* may be polygon-shaped or ring-shaped corresponding to the shape of the stationary frame body 11 or the movable frame body 13. Moreover, the shape of the connecting arms 121-126 is not limited to the linear shape. They may have a curved shape, such as an arc shape.

Further, while two flat springs for swinging 12 are used to suspend the movable frame body 13 in the aforementioned example, the suspension can be performed by using one flat spring for swinging 12.

Further, while the circumstance that the movable frame body 13 is swung in the XY plane has been described in the aforementioned example, the arrangement of mutually reverse magnetic poles for the adjacent magnets and the use of currents in the same direction to power two coils arranged opposite to each other in a diagonal direction of the movable frame body 13 can cause the movable frame body 13 to rotate around an axis parallel to the Z axis. In this way, rectilinear shakes, such as horizontal vibrations, as well as rotational shakes generated can be suppressed.

Figure 9:
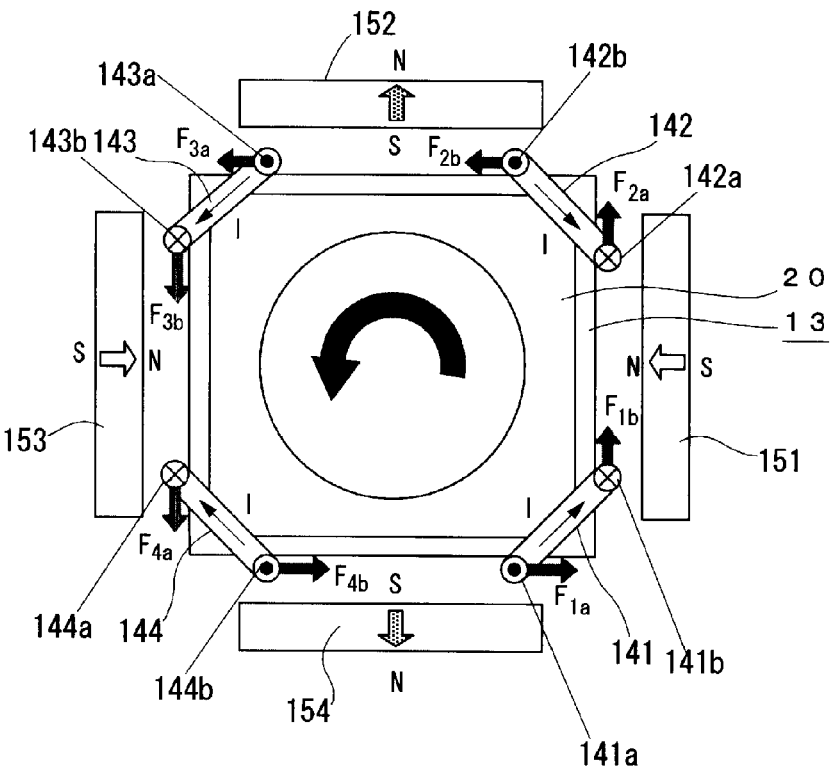
FIG. 9 is an exemplary diagram illustrating the direction of the current flowing in the coil set for swinging and the Lorentz force acting upon the driving coil when the shake generated accompanying the rotation is suppressed.

Further, under the circumstance that all the first through fourth coils 141-144 are powered, as shown in FIG. 9, the magnetic poles of the first magnet 151 and the third magnet 153 at respective sides close to the movable frame body 13 are set to be N poles and the magnetic poles of the second magnet 152 and the fourth magnet 154 at respective sides close to the movable frame body 13 are set to be S poles. Moreover, the directions of the currents powering the first and third coils 141, 143 are set to be "−" directions and the directions of the currents powering the second and fourth coils 142, 144 are set to be "+" directions. In this way, the movable frame body 13 can rotate in the counterclockwise direction around an axis parallel to the Z axis with respect to which the rotation center is the lens center.

Further, the rotation of the movable frame body 13 in the counterclockwise direction can be achieved by merely powering the first and third coils 141, 143 with currents in "−" directions or by merely powering the second and fourth coils 142, 144 with currents in "+" directions. Moreover, the movable frame body 13 will rotate in the clockwise direction if the directions of the currents powering the first through fourth coils 141-144 are reverse to the aforementioned directions.

Further, the movable frame body 13 can rotate eccentrically. In this case, mutually reverse magnetic poles are arranged for the adjacent magnets, and the coils arranged opposite to each other are powered by currents in different directions. Alternatively, the power level of the current powering the coil at the eccentric side can be controlled to be lower than that of the current powering the coil at the side reverse to the eccentric side.

Figure 10:
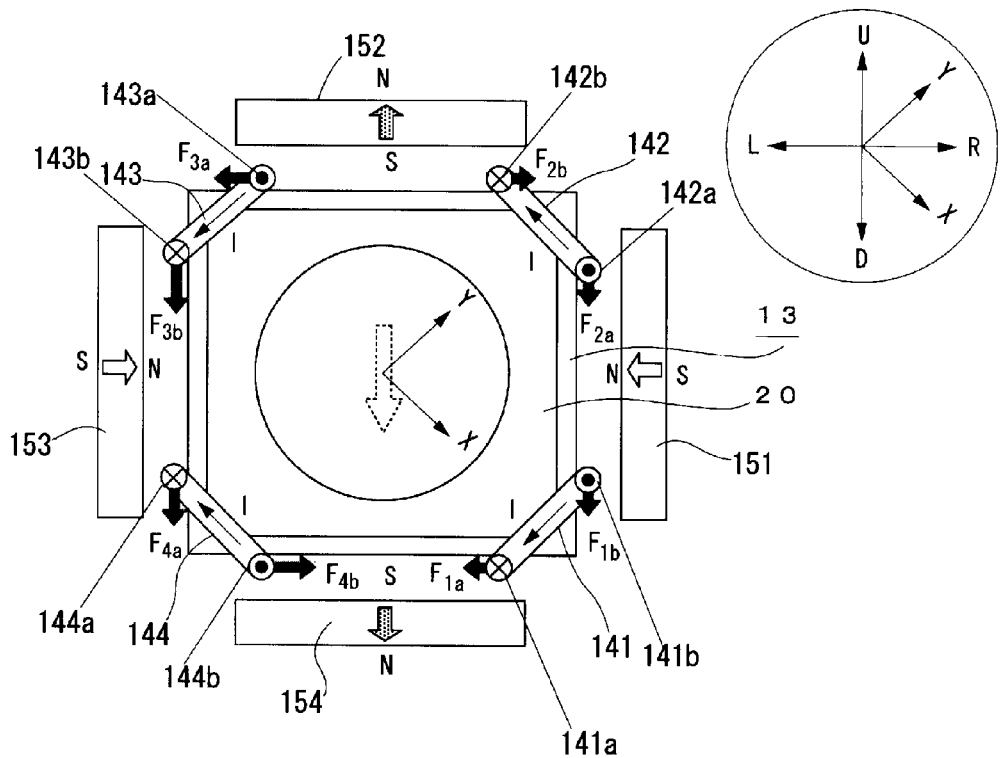
FIG. 10 is an exemplary diagram illustrating the direction of the current flowing in the coil set for swinging and the Lorentz force acting upon the driving coil when the shake generated due to the displacement of the rotation center is suppressed.

Specifically, as shown in FIG. 10, the magnetic poles of the first magnet 151 and the third magnet 153 at respective sides close to the movable frame body 13 are set to be N poles, the magnetic poles of the second magnet 152 and the fourth magnet 154 at respective sides close to the movable frame body 13 are set to be S poles, the directions of the currents powering the first and fourth coils 141, 144 are set to be "+" directions, and the directions of the currents powering the second and third coils 142, 143 are set to be "−" directions. If the power levels of the currents powering the first and second coils 141, 142 located at the R side are lower than the power levels of the currents powering the third and fourth coils 143, 144 located at the L side, the driving force in the D direction acting upon the L side coils (the third and fourth coils 143, 144) is different from that acting upon the R side coils (the first and second coils 141, 142). Accordingly, the movable frame body 13 rotates in the counterclockwise direction around a rotation center displaced toward the R side.

Similarly, the rotation center of the movable frame body 13 can be displaced toward the L side, U side or D side.

Further, referring to FIG. 10, if the power levels of the currents powering the first and second coils 141, 142 located at the R side are manipulated to be "the same as the L side→zero→the same as the L side with the direction of the current in reverse", the movable frame body 13 can be "moved linearly in the D direction→rotated toward the left side and eccentrically to the R side→rotated in the counterclockwise direction around the lens rotation center".

The Second Embodiment

Figure 11:
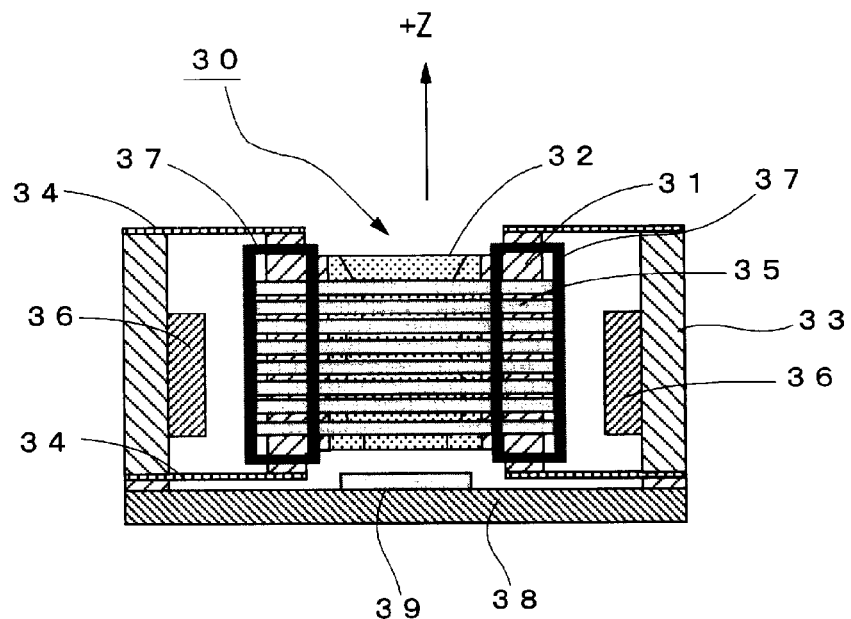
FIGS. 11(*a*) and 11(*b*) are diagrams illustrating the structure of a lens driving device in accordance with a second embodiment of the present invention.
Figure 11:
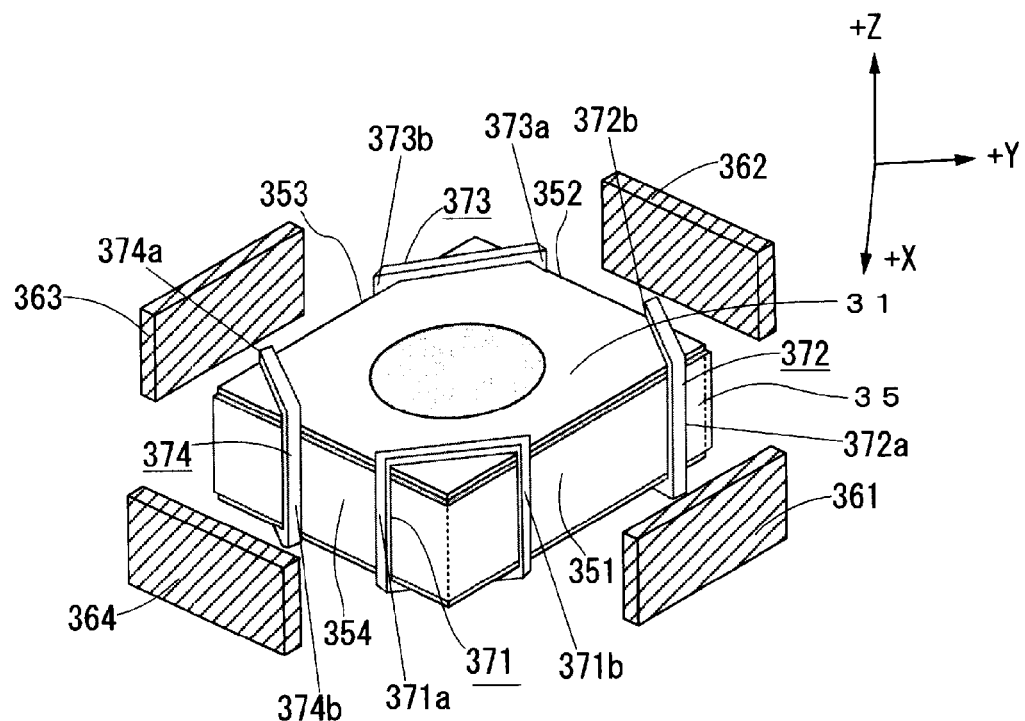

FIG. 11 illustrates the structure of a camera module 30 with a shake suppression function in accordance with a second embodiment of the present invention. FIG. 11(a) is a section view of the camera module 30, and FIG. 11(b) is a main component oblique view showing the relation between the driving coil 35, the permanent magnet set 36 and the coil set for swinging 37.

The camera module 30 with a shake suppression function comprises a lens holder 31 holding a lens 32 constructed by at least one object lens and at least one ocular lens, a case 33 arranged outside the lens holder 31 to hold the lens holder 31, a spring member 34 connecting the lens holder 31 and the case 33, a driving coil 35 mounted on an outer circumference of the lens holder 31, a permanent magnet set 36 mounted on an inner side portion of an outer circumference of the case 33, a shake sensor (not shown), a coil set for swinging 37 mounted on an outer circumferential side of the driving coil 35 and positioned at the outer circumference of the lens holder 31, a sensor holding pedestal 38 disposed on the case 33 at the side reverse to the object side, an image sensor 39 mounted on the sensor holding pedestal 38 at the side close to the lens holder 31, and a current control means (not shown).

Figure 12:
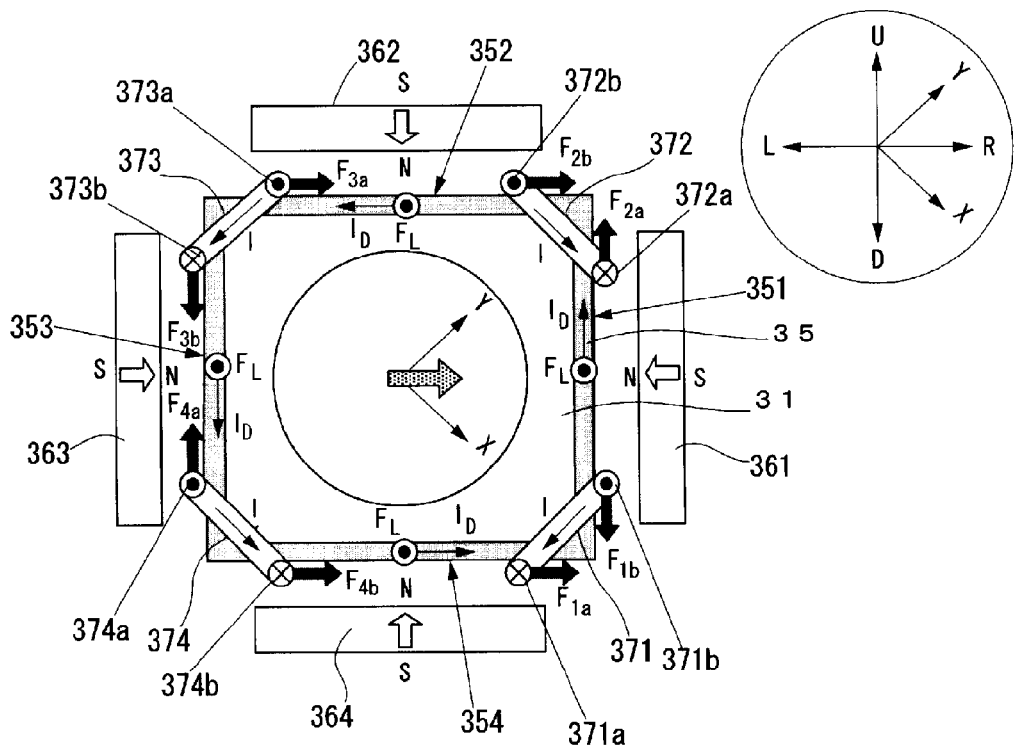
FIG. 12 is a main component oblique view of the lens driving device of the present invention and a diagram illustrating the relation between the direction of the current flowing in the coil set for swinging and the Lorentz force acting upon the driving coil.

As shown in FIG. 12, when the object direction is designated as a forward direction of the Z axis (+Z side), the driving coil 35 is the coil wound around the Z axis for performing auto-focus driving operation. In this example, the lens holder 31 is a square barrel-shaped component when viewed from the +Z side.

The coil set for swinging 37 includes a first coil 371 wound around the X axis and arranged at the +X side portion of the outer circumference of the driving coil 35, a second coil 372 wound around the Y axis and arranged at the +Y side portion, a third coil 373 wound around the X axis and arranged at the −X side portion, and a fourth coil 374 wound around the Y axis and arranged at the −Y side portion.

The permanent magnet set 36 includes a first through fourth magnets 361-364 having magnetic fields in directions perpendicular to the plate surfaces. The first through fourth magnets 361-364 are mounted on the inner wall of the case 33 with their magnetic fields arranged in directions the same as those of the sides 351-354 of the driving coil 35.

As shown in FIG. 12, the first magnet 361 is arranged between the section 371b of the first coil 371, which is parallel to the Z axis and close to the second coil 372, and the section 372a of the second coil 372, which is parallel to the Z axis and close to the first coil 371. A magnetic field in a direction from the R side to the L side is applied to the side 351 of the driving coil 35, the section 371b of the first coil 371 and the section 372a of the second coil 372.

Similarly, the second magnet 362 is arranged between the section 372b of the second coil 372, which is parallel to the Z axis and close to the third coil 373, and the section 373a of the third coil 373, which is parallel to the Z axis and close to the second coil 372. A magnetic field in a direction from the U side to the D side is applied to the side 352 of the driving coil 35, the section 372b of the second coil 372 and the section 373a of the third coil 373.

Further, the third magnet 363 is arranged between the section 373b of the third coil 373, which is parallel to the Z axis and close to the fourth coil 374, and the section 374a of the fourth coil 374, which is parallel to the Z axis and close to the third coil 373. A magnetic field in a direction from the L side to the R side is applied to the side 353 of the driving coil 35, the section 373b of the third coil 373 and the section 374a of the fourth coil 374.

The fourth magnet 364 is arranged between the section 374b of the fourth coil 374, which is parallel to the Z axis and close to the first coil 371, and the section 371a of the first coil 371, which is parallel to the Z axis and close to the fourth coil 374. A magnetic field in a direction from the D side to the U side is applied to the side 354 of the driving coil 35, the section 374b of the fourth coil 374 and the section 371a of the first coil 371.

Further, the spring member 34 has the same structure as the spring member 12 of the aforementioned first embodiment, thus no further description will be provided.

The motion of the camera module 30 with a shake suppression function will be described in the following paragraphs.

Regarding the auto-focus driving operation, the driving coil 35 is powered to cause the movement of the lens holder 31 in the Z axis direction. Specifically, as shown in FIG. 12, if a current ID in the counterclockwise direction, as indicated by the arrows in FIG. 12, flows in the driving coil 35, a Lorentz force FL in a direction toward the +Z side is generated at each of the sides 351-354 of the driving coil 35 due to the magnetic fields in directions perpendicular to the sides 351-354 of the driving coil 35 from the first through fourth magnets 361-364. Accordingly, the lens holder 31 is moved to a position where a balance between the Lorentz force FL and the restoring force of the spring members 34, 34 is attained.

A clockwise current flowing in a direction reverse to the direction indicated by the arrows in FIG. 12 can be applied to the driving coil 35 to cause the movement of the lens holder 31 in a direction toward the −Z side.

Regarding the shake suppression operation, one or more than one of the first through fourth coils 371-374 are powered.

Firstly, a shake sensor (not shown) is used to detect whether shake occurs in the case 33 serving as the stationary member. When shake occurs, the degree and the direction information of the shake detected by the shake sensor is sent to a current control means (not shown). The current control means controls the magnitudes and the directions of the currents powering the first through fourth coils 371-374 according to the detected degree and direction of the shake so that the movable frame body can be swung to suppress the shake.

The directions of the currents powering the first through fourth coils 371-374 are defined as follows.

When viewed from the +Z side, the direction of the current flowing in the first coil 371 from the side 351 to the side 354 of the driving coil 35 is designated as "+" direction, and the direction of the current flowing in the first coil 371 from the side 354 to the side 351 is designated as "−" direction. The direction of the current flowing in the second coil 372 from the side 352 to the side 351 of the driving coil 35 is designated as "+" direction, and the direction of the current flowing in the second coil 372 from the side 351 to the side 352 is designated as "−" direction. The direction of the current flowing in the third coil 373 from the side 353 to the side 352 is designated as "+" direction, and the direction of the current flowing in the third coil 373 from the side 352 to the side 353 is designated as "−" direction. The direction of the current flowing in the fourth coil 374 from the side 354 to the side 353 is designated as "+" direction, and the direction of the current flowing in the fourth coil 374 from the side 353 to the side 354 is designated as "−" direction.

Regarding the camera module 30 with a shake suppression function of this embodiment, the relation between the permanent magnet set 36 and the coil set for swinging 37 is shown in FIG. 11(b) and FIG. 12. As the case 33 and the lens holder 31 provided with the driving coil 35 function similarly to the stationary frame body 11 and the movable frame body 13 of the aforementioned first embodiment, the directions of the currents powering the first and second coils 371, 372 are set to be "+" directions and the directions of the currents powering the third and fourth coils 373, 374 are set to be "−" directions when a shake that causes the case 33 to move in the L direction occurs. In this way, as the first and third coils 371, 373 are pushed in the +X direction and the second coil 372 and the fourth coil 374 are pushed in the +Y direction, the lens holder 31 is swung in the R direction. Accordingly, the shake that causes the case 33 to move in the L direction can be suppressed.

Further, like the first embodiment, with the first coil 371 and the second coil 372 powered by currents in "+" directions and the third and fourth coils 373, 374 not powered, the lens holder 31 can be swung in the R direction. Alternatively, even if the first and second coils 371, 372 are not powered, the lens holder 31 can be swung in the R direction by powering the third coil 373 and the fourth coil 374 with currents in "−" directions.

Further, when a shake that causes the case 33 to move in the R direction occurs, the directions of the currents powering the first and second coils 371, 372 can be set to be "−" directions and the directions of the currents powering the third and fourth coils 373, 374 can be set to be "+" directions, thereby the case 33 can be swung in the L direction. Moreover, with the third coil 373 and the fourth coil 374 powered by currents in "+" directions and the first and second coils 371, 372 not powered, the case 33 can be swung in the L direction. Alternatively, even if the third and fourth coils 373, 374 are not powered, the case 33 can be swung in the L direction by powering the first coil 371 and the second coil 372 with currents in "−" directions.

When a shake that causes the case 33 to move in the D direction occurs, the current control means controls the directions of the currents powering the second and third coils 372, 373 to be "+" directions and the directions of the currents powering the fourth and first coils 374, 371 to be "−" directions, thereby the case 33 can be swung in the U direction. Moreover, with the second coil 372 and the third coil 373 powered by currents in "+" directions and the fourth and first coils 374, 371 not powered, the case 33 can be swung in the U direction. Alternatively, even if the second and third coils 372, 373 are not powered, the case 33 can be swung in the U direction by powering the fourth coil 374 and the first coil 371 with currents in "−" directions.

Under the circumstance that a shake that causes the case 33 to move in the U direction occurs, if the directions of the currents powering the second and third coils 372, 373 are set to be "−" directions and the directions of the currents powering the fourth and first coils 374, 371 are set to be "+" directions, the case 33 can be swung in the D direction. Moreover, with the fourth coil 374 and the first coil 371 powered by currents in "+" directions and the second and third coils 372, 373 not powered, the case 33 can be swung in the D direction. Alternatively, even if the fourth and first coils 374, 371 are not powered, the case 33 can be swung in the D direction by powering the second coil 372 and the third coil 373 with currents in "−" directions.

Further, when the polarity of the first through fourth magnets 361-364 at respective sides close to the case 33 is reversed, the case 33 can be moved in a reverse direction by means of the aforementioned powering conditions.

Further, in the second embodiment, the case 33 may have an octagon-shaped contour when viewed from the +Z side by arranging concave portions at the +X side, −X side, +Y side and −Y side.

Further, under the circumstance that the case 33 has an octagon-shaped contour when viewed from the +Z side, the shapes and relative positions of the first through fourth magnets 361-364 and the first through fourth coils 371-374 may be the same as the shapes and relative positions of the first through fourth magnets 151-154 and the first through fourth coils 141-144, as shown in FIGS. 6(a), (b).

Further, the lens holder 31 may has a cylindrical shape, and the first through fourth magnets 361-364 may be arc-shaped columnar magnets. In this case, the relation between the first through fourth magnets 361-364 and the first through fourth coils 371-374 may be the same as that between the first through fourth magnets 151-154 and the first through fourth coils 141-144 in the first embodiment, as shown in FIG. 7.

Figure 13:
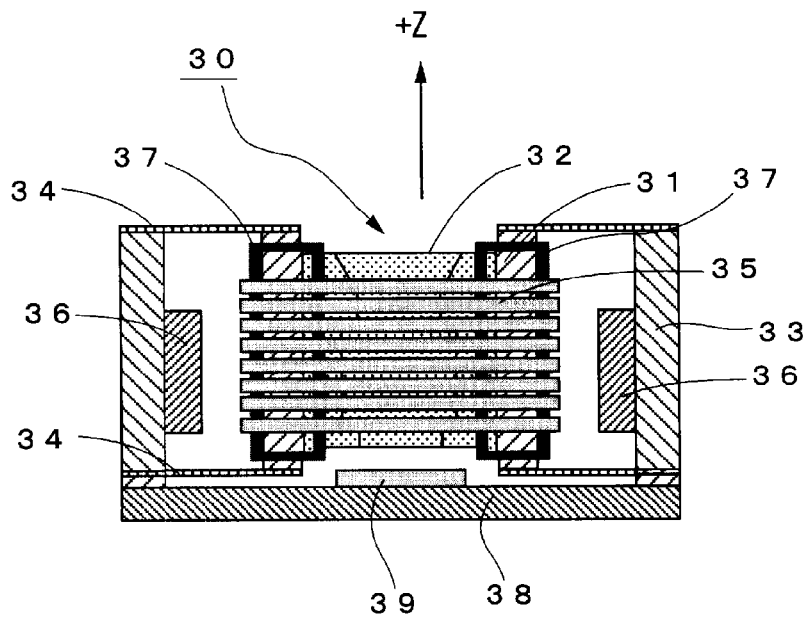
FIG. 13 is a diagram illustrating another exemplary positional relation between the driving coil and the coil set for swinging in accordance with the lens driving device of the present invention.

While the coil set for swinging 37 is mounted on the outer circumferential side of the driving coil 35 in the aforementioned example, as shown in FIG. 13, arranging the coil set for swinging 37 at the inner circumferential side of the driving coil 35 can achieve the same effect.

The embodiments of the present invention described hereinbefore are exemplary and not intended to limit the scope of the present invention. It is apparent for those ordinarily skilled in the art that various modifications and alterations may be made to the present invention within the scope and spirit of the appended claims. It is apparent from the claims that the configurations with such modifications and alterations are included in the scope of the present invention.

What is claimed is:

1. An electromagnetically driven device, comprising:
   a stationary member;
   a barrel-shaped or column-shaped movable member;
   a spring member suspending the movable member from the stationary member;
   a coil set for swinging; and
   a permanent magnet set;
   the electromagnetically driven device is characterized in that:
   the coil set for swinging is mounted on an outer circumference of the movable member and positioned between the movable member and the permanent magnet set while the permanent magnet set is mounted on the stationary member and arranged opposite to the coil set for swinging with spacing, that
   when an axial direction of the movable member is designated as the Z axis, the configuration of the coil set for swinging including a first through fourth coils is such that the first through fourth coils are wound around axes perpendicular to the Z axis, arranged around the Z axis in numeral sequence and spaced at uniform intervals, and that
   the permanent magnet set includes a first through fourth magnets, wherein each magnet is arranged between two adjacent sections parallel to the Z axis of two adjacent coils among the first through fourth coils.

2. The electromagnetically driven device according to claim 1, wherein the movable member holds a lens unit,
   a driving coil wound around the Z axis is mounted on an outer circumferential side of the movable member, and
   the coil set for swinging is mounted on an outer circumferential side of the driving coil.

3. The electromagnetically driven device according to claim 1, wherein the movable member holds a lens unit,
   a driving coil wound around the Z axis is mounted on the outer circumferential side of the movable member, and
   the coil set for swinging is mounted on an inner circumferential side of the driving coil.

4. The electromagnetically driven device according to claim 1, wherein the movable member holds a camera module.

\* \* \* \* \*